US006907740B2

(12) United States Patent
Tom

(10) Patent No.: US 6,907,740 B2
(45) Date of Patent: Jun. 21, 2005

(54) GAS CHARGING SYSTEM FOR FILL OF GAS STORAGE AND DISPENSING VESSELS

(75) Inventor: Glenn M. Tom, New Milford, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 6 days.

(21) Appl. No.: 10/625,178

(22) Filed: Jul. 23, 2003

(65) Prior Publication Data

US 2005/0016186 A1 Jan. 27, 2005

(51) Int. Cl.[7] .............................. B01D 8/00; F17C 7/04
(52) U.S. Cl. ......................................... 62/55.5; 62/48.1
(58) Field of Search ................................. 62/55.5, 48.1, 62/50.2, 46.1

(56) References Cited

U.S. PATENT DOCUMENTS

| | | | | |
|---|---|---|---|---|
| 2,469,434 A | * | 5/1949 | Hansen et al. ............... | 62/50.2 |
| 5,673,562 A | * | 10/1997 | Friedt ......................... | 62/48.1 |
| 5,935,305 A | * | 8/1999 | Tom et al. ................... | 96/143 |
| 6,023,933 A | * | 2/2000 | Langan et al. ............... | 62/50.2 |
| 6,089,027 A | * | 7/2000 | Wang et al. .................. | 62/46.1 |
| 6,101,816 A | | 8/2000 | Wang et al. | |
| 6,305,190 B1 | * | 10/2001 | Driehuys et al. ............. | 62/637 |
| 6,343,476 B1 | | 2/2002 | Wang et al. | |
| 6,382,227 B1 | * | 5/2002 | Birch et al. ................... | 137/3 |
| 6,474,077 B1 | * | 11/2002 | Botelho et al. ............... | 62/50.2 |
| 2003/0010040 A1 | * | 1/2003 | Torres et al. ................ | 62/50.2 |

* cited by examiner

Primary Examiner—William C. Doerrler
(74) Attorney, Agent, or Firm—Steven J. Hultquist; Margaret Chappuis; Yongzhi Yang

(57) ABSTRACT

An apparatus and method for charging a gas storage and dispensing vessel with gas to a predetermined pressure level, e.g., a gas to be employed in a semiconductor manufacturing operation such as a hydride, halide or organometallic reagent gas. In the gas charging, a source gas is liquefied, e.g., in a cryotrap, and then gasified in closed flow communication with the vessel to introduce the gas thereinto, and such liquefaction/gasification steps are carried out alternatively and repetitively, to charge the vessel in a step-wise, progressive fashion with gas, until a full fill state is achieved, with the contained gas at the predetermined pressure level.

32 Claims, 1 Drawing Sheet

GAS CHARGING SYSTEM FOR FILL OF GAS STORAGE AND DISPENSING VESSELS

FIELD OF THE INVENTION

The present invention relates generally to gas storage and dispensing apparatus and methods, and more specifically to a gas charging system that is useful to charge gas storage and dispensing vessels for holding gas at elevated pressures.

DESCRIPTION OF THE RELATED ART

In a wide variety of industrial processes, there is a need for compact and reliable gas supplies. Examples include semiconductor manufacturing, ion implantation, manufacture of flat panel displays, medical intervention and therapy, water treatment, emergency breathing equipment, welding operations, space-based delivery of gases, etc.

In these applications, the requirement for a compact source of gas generally necessitates the deployment of pressurized gas vessels, since the inventory of available gas is maximized by correspondingly maximized pressure level of the gas in the as-furnished storage and dispensing system. As a result, it has been common practice in the gas supply industry to utilize high pressure gas cylinders, which are vessels of elongate cylindrical form, having thick walls formed of steel or other metal alloy, to store and transport the gas for subsequent dispensing and use.

While such high-pressure gas storage and dispensing vessels have come into widespread usage, there are associated problems with certain industrial gases, and with specific forms of gas containment vessels. Gases which are high boiling point gases, e.g., boron trifluoride, may condense during charging of the gas storage and dispensing vessel at high pressure levels, and create anomalous thermal effects as the charged gas expands in the vessel, due to Joule-Thompson cooling of the charged fluid.

A specific type of gas storage and containment vessel that has come into recent usage in the semiconductor manufacturing field is described more fully in U.S. Pat. No. 6,101,816 issued Aug. 14, 2000 in the names of Luping Wang and Glenn M. Tom, U.S. Pat. No. 6,089,027 issued Jul. 18, 2000 in the names of the same inventors, and U.S. Pat. No. 6,343,476 issued Feb. 5, 2002 in the names of the same inventors, which features a gas storage and dispensing vessel with associated gas dispensing componentry, such as a valve head assembly of conventional type, and wherein a gas regulator assembly is interiorly disposed in the gas storage and dispensing vessel's interior volume.

The gas regulator in such gas storage and dispensing systems may be of a type featuring a gas-actuated pressure-sensing assembly to precisely control outlet pressure, wherein a slight increase or decrease in the outlet pressure causes the pressure-sensing assembly to expand or contract, respectively. The expansion or contraction of the pressure-sensing assembly in turn adjusts the assembly, e.g., by movement of a poppet or other valve element, to provide precise pressure control.

The arrangement of such vessels as having a gas regulator assembly interiorly disposed in the vessel permits the vessel to contain gas at high superatmospheric pressure levels, against the regulator, but to dispense fluid at a substantially lower set point pressure level, e.g., low superatmospheric pressure, or even sub-atmospheric pressure in the case of gas-consuming operations such as ion implantation. Because the regulator is interiorly disposed in the vessel interior volume, the regulator is protected from impact and atmospheric conditions that could otherwise deleteriously affect its integrity and operability.

In the filling of the interior regulator-equipped gas storage and dispensing vessels with high pressure gases, the aforementioned problems attendant Joule-Thompson cooling of the charged gas upon its expansion into the interior vessel volume, and associated thermal effects including gas liquefaction, create difficulties in single-step charging. Because the regulator is inside the vessel, the approaches that are employed when regulators are external of the vessel being filled cannot be used.

Specifically, when the regulator is exterior of the vessel, and the fill gas is flowed through the regulator and associated piping into the vessel, the regulator can be wrapped with a heating tape, or encased in a thermal blanket or shrouded in a heating mantle. When such approaches are attempted with an internal regulator, they are inefficient, ineffective and/or can be difficult or dangerous to implement. Liquefied gases exiting a regulator and entering process lines cause poor regulation, over-pressurization, and the inability to control and monitor flow rates effectively.

Cascading gas fill arrangements have therefore been proposed in application to internal regulator vessels, which however are disadvantageous as requiring multiple high-pressure source vessels to fill the gas storage and dispensing vessel to increasing pressure levels.

The provision of a large number of high pressure source vessels for such purpose is undesirable from the standpoint of efficient operation and minimization of fill time, since each successive charging step in the aforementioned cascaded fill system will involve establishment of closed flow communication between the gas storage and dispensing vessel and a particular supply vessel for the period of the fill step, followed by uncoupling or disconnection of the previously coupled gas supply vessel, whereupon a new fluid flow connection must be made between the gas storage and dispensing vessel and the next succeeding gas supply vessel.

The above-discussed problems therefore limit the efficiency of the gas charging operation and necessitate additional capital expense in the provision of multiple source vessels of the high pressure gas, and the attendant requirements of piping, valving, manifolding, instrumentation, etc.

The foregoing problems, while attendant the use of internal regulator-equipped gas storage and dispensing vessels of the above-discussed type, are not limited thereto, and also are present and disadvantageous in application to a wide variety of gas storage and dispensing vessels of other and variant types.

Accordingly, it would be a substantial advance in the art to provide a high pressure gas charging system for the fill of gas storage and dispensing vessels, which obviates the problems associated with the use of a cascade fill system or alternatively the practice of conventional charging of fill gas through a small diameter port or fill conduit, as discussed above.

SUMMARY OF THE INVENTION

The present invention relates to a gas charging assembly that is useful to charge gas storage and dispensing vessels for holding gas at high pressures.

In one aspect, the present invention relates to a gas charging system for charging of a gas storage and delivery apparatus including a gas storage and delivery vessel having an interior volume for holding gas for subsequent dispensing, said gas charging system comprising:

(a) a gas source of the gas to be charged to the vessel;

(b) a cryotrap;

(c) a refrigerator unit coupled to the cryotrap and selectively actuatable to supply refrigeration to the cryotrap, and de-actuatable to terminate the supply of refrigeration to the cryotrap;

(d) flow circuitry interconnecting the gas source and cryotrap, arranged for selective initiation of flow of gas from the gas source to the cryotrap, and selection termination of flow of gas from the gas source to the cryotrap, said flow circuitry further coupleable to a vessel to be charged with gas, to interconnect the cryotrap and said vessel, and said flow circuitry being operably arranged for flowing gas to the cryotrap and refrigerating the cryotrap by the refrigerator unit to liquefy gas in the cryotrap, while the flow circuitry is closed to flow between the cryotrap and the vessel, in a first phase of operation, and terminating refrigeration of the cryotrap by the refrigerator unit to warm the cryotrap and gasify liquid therein, with the flow circuitry closed to flow of gas from the gas source to the cryotrap, and open to flow of gasified gas from the cryotrap to the vessel, in a second phase of operation.

Another aspect of the invention relates to a gas charging system for charging a gas storage and dispensing vessel with gas, said gas charging system comprising:

a gas source comprising gas to be charged to the vessel;

a source/fill line connecting the gas source in flow communication with said vessel;

a cryotrap arranged for selective cooling of gas to liquefy same, and warming of liquefied gas to gasify same;

a valved manifold assembly interconnecting the source/fill line and the cryotrap and arranged to selectively flow gas from the gas source through the valved manifold assembly to the cryotrap for liquefaction of source gas therein during a first phase of operation, and to selectively flow gasified gas from the cryotrap through the valved manifold assembly to the source/fill line for flow to the vessel during a second phase of operation; and a controller arranged to operate valves of the valved manifold assembly to conduct said first and second phases of operation in an alternating and repetitive manner, to progressively fill said vessel with gas to a filled state.

A further aspect of the invention relates to a method of charging a gas storage and dispensing vessel with a gas to a predetermined pressure level, comprising:

(a) providing source gas;

(b) liquefying said source gas to form a source liquid;

(c) gasifying the source liquid in closed flow communication with the vessel, to flow the gasified gas into the vessel; and (d) repeating steps (a)–(c) in sequence, for sufficient repetitions to fill the vessel with gasified gas to said predetermined pressure level.

Other aspects, features and embodiments of the present invention will be more fully apparent from the ensuing disclosure and appended claims.

DETAILED DESCRIPTION OF THE INVENTION, AND PREFERRED EMBODIMENTS THEREOF

Figure 1:
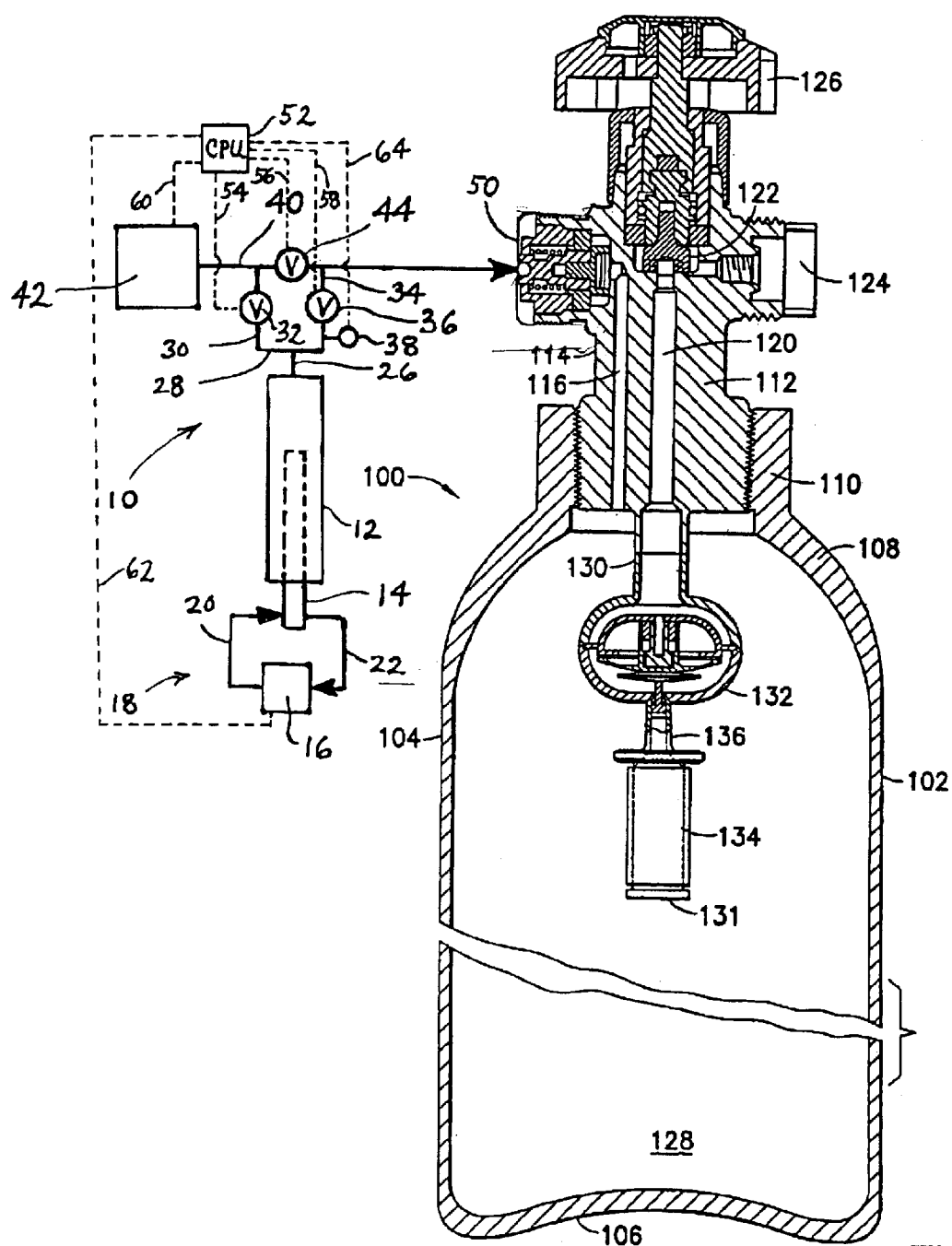
FIG. 1 is a schematic representation of a gas charging assembly in accordance with the present invention, in one embodiment thereof, as used in connection with an illustrated gas storage and dispensing system including a gas storage and dispensing vessel having a gas regulator assembly disposed in the interior volume thereof.

The disclosures of the following U.S. Patents are hereby incorporated herein by reference in their respective entireties: U.S. Pat. No. 6,101,816 issued Aug. 14, 2000 in the names of Luping Wang and Glenn M. Tom; U.S. Pat. No. 6,089,027 issued Jul. 18, 2000 in the names of Luping Wang and Glenn M. Tom; and U.S. Pat. No. 6,343,476 issued Feb. 5, 2002 in the names of Luping Wang and Glenn M. Tom.

The present invention is based on the discovery that a gas storage and dispensing vessel can be rapidly and efficiently filled with high pressure gas in a simple manner using a cryotrap in a cyclic repetitive manner to effect sequential liquefaction of source gas, followed by warming of the cryotrap to allow the liquefied gas to vaporize and flow into the gas storage and dispensing vessel, with the successive liquefaction and vaporization cycles being conducted until the desired gas pressure level in the vessel is achieved.

The invention therefore utilizes cryopumping of the gas to be stored to effect filling of the vessel to a desired pressure level.

The approach of the invention is a departure from the gas filling/charging methods of the prior art, in which the emphasis has been placed on avoiding any cooling of charged gas upon entry to the vessel incident to the expansion and cooling of the gas, particularly when the fill orifice is small and there is a high degree of cooling due to the Joule-Thompson effect. By proceeding in a manner opposite to the approach of the prior art to heat the gas to the extent possible to avoid problems of liquefaction, the present invention specifically promotes the repetitive liquefaction of successive charges of the source gas to be introduced into the storage and dispensing vessel and then gasifies the resultantly liquefied gas so that the extremely high volumetric expansion of liquid to gas is employed to successively boost the pressure to the desired level, without the requirement of different high pressure fill vessels as in a cascaded gas fill system as described hereinabove.

While the ensuing description is directed illustratively to gas storage and dispensing vessels of a type having an internal gas regulator, as a preferred embodiment of the invention, it will be recognized that the utility of the invention is not thus limited but rather broadly extends to the filling of any gas storage and dispensing vessel with gas to be stored in and subsequently dispensed from the vessel.

In respect of such internal gas regulator-equipped gas storage and dispensing vessels, the vessel may contain a single regulator assembly or alternatively two or more such gas regulators in the interior volume of the vessel adapted for holding pressurized gas.

In such arrangement, the regulator (or multiple regulator assembly) is disposed between a confined pressurized gas volume and a gas dispensing assembly. The gas dispensing assembly can be variously configured, e.g., including a gas flow control element such as a gas flow shut off valve, mass flow controller, or the like. The gas dispensing assembly associated with the gas storage and dispensing vessel therefore can include a valve head assembly with interior gas flow passages and valve flow control elements coupled with exterior manual hand wheel, automatic actuator or other componentry, to selectively flow gas out of the vessel at a pressure that is determined by the set point(s) of the regulator(s) in the interior volume of the vessel.

As mentioned hereinabove, by positioning the regulator inside the gas storage and dispensing vessel, the regulator is protected by the vessel from impact, environmental exposure and damage. Additionally, the regulator acts as a safety containment element for the high-pressure gas, in that the regulator is set at a significantly lower pressure set point so that gas dispensed from the vessel is at pressure well below that of the bulk volume of pressurized gas in the vessel.

The gas pressure regulator devices useful in the broad practice of the invention can be of any suitable type. Preferred regulators include the Swagelok® HF series of set pressure regulators (commercially available from Swagelok Company, www.swagelok.com), having a set point pressure in a range of from vacuum levels to pressures on the order of 2550 psig. The use of high-precision regulators permits gas to be reliably dispensed from the vessel containing the interior regulator, at the desired set point pressure level.

The gas pressure regulator in one embodiment is advantageously of a poppet valve type, comprising a poppet element that is biased to a seat structure to prevent flow at a pressure above the set point value. Such regulator uses a gas-actuated pressure-sensing, assembly that accommodates changes in outlet pressure by responsive expansion/contraction of the pressure-sensing assembly and translation of the poppet, to maintain the set point pressure.

The gas pressure regulator thus is set to an appropriate level, e.g., 700 Torr, to provide flow of gas from the gas storage and dispensing vessel at such set point pressure level, when the dispensing assembly associated with the gas vessel is opened to flow, by opening a flow control valve of the dispensing assembly or in other appropriate manner.

The dispensing assembly associated with the vessel defines a flow circuit, which may for example comprise, in addition to the valve head and flow control components already mentioned, an extended length ("run") of conduit, or a manifold to which the gas vessel is coupled for the dispensing operation. The flow circuit can include suitable instrumentation and control means, to monitor the gas dispensing operation, to effect switchover between multiple gas vessels coupled to the flow circuit (e.g., in a multi-vessel manifold arrangement), and/or to provide for cyclic or intermittent operation to accommodate a downstream gas-consuming facility being supplied with gas from the vessel.

The gas contained in the gas storage and dispensing vessel of the invention can comprise any suitable gas, such as for example a hydride gas for semiconductor manufacturing operations. Examples of hydride gases of such type include arsine, phosphine, stibine, silane, chlorosilane, and diborane. Other gases useful in semiconductor manufacturing operations may be employed, including acid gases such as hydrogen fluoride, boron trichloride, boron trifluoride, hydrogen chloride, halogenated silanes (e.g., $SiF_4$) and disilanes (e.g., $Si_2F_6$), etc., having utility in semiconductor manufacturing operations as halide etchants, cleaning agents, source reagents, etc. Other reagents include gaseous organometallic reagents used as precursors for metalorganic chemical vapor deposition (MOCVD).

Referring now to the drawing, FIG. 1 is a schematic representation of a gas charging system in accordance with the present invention, in one embodiment thereof, as used in connection with an illustrated gas storage and dispensing system including a gas storage and dispensing vessel having a gas regulator assembly disposed in the interior volume thereof.

FIG. 1 shows a schematic cross-sectional elevation view of one gas storage and dispensing apparatus 100 according to an illustrative embodiment of the invention, as arranged for gas filling by the gas charging system 10. The gas storage and dispensing apparatus 100 includes a fluid storage and dispensing vessel 102 of generally cylindrical form, with a cylindrical sidewall 104 closed at its lower end by floor member 106. At the upper end of the vessel is a neck 108 including a cylindrical collar 110 defining and circumscribing a top opening (port) of the vessel. The vessel wall, floor member and neck thereby enclose an interior volume 128, as shown.

At the neck of the vessel, a threaded plug 112 of the valve head assembly 114 is threadably engaged with the interior threaded opening of the collar 110. The valve head assembly 114 includes a central fluid flow passage 120 joined in fluid flow communication with a central working volume cavity in the valve head assembly. The central working volume cavity in turn is joined to outlet 124, which may be exteriorly threaded or otherwise constructed for attachment of a connector and associated piping, conduit, etc. thereto.

Disposed in the central working volume cavity is a valve element 122 that is joined to a hand wheel 126 in the embodiment shown, but may alternatively be joined to an automatic valve actuator or other controller or actuator.

The valve head assembly 114 also features in the valve block a fill passage 116 communicating with a fill port 50 and the interior volume 128 of the vessel. The vessel 102 may thereby be charged with pressurized gas, following which the fill port 50 is closed and capped.

The central fluid flow passage 120 in the valve head assembly 114 is joined at its lower end to a connector flow tube 130, to which in turn is joined to the regulator 132. The regulator is set to maintain a selected pressure of the fluid discharged from the vessel.

At the lower end of the regulator is joined a tubular fitting 136 which in turn is joined, e.g., by butt welding, to a filter unit 134 having a diffuser end cap 131 at its lower extremity. The filter unit can be formed of stainless steel, with the diffuser wall being formed of a sintered stainless steel such as 316L stainless steel. The filter unit has a wall porosity that permits removal of all particles greater than a predetermined diameter, e.g., greater than 0.003 micrometers at 30 standard liters per minute flow rate of gas from the system. Filter units of such type are commercially available from Mott Corporation (Farmington, Conn.).

In use, a pressurized gas is contained in the interior volume 128 of the vessel 102. The gas pressure regulator 132 is set to a selected set point to provide flow of dispensed gas when the valve in the valve head assembly 114 is opened, with the gas flowing through the filter unit 134, fitting 136, regulator 132, connector flow tube 130, central fluid flow passage 120 in the valve head assembly 114, the central working volume cavity, and outlet 124. The valve head assembly may be joined to other piping, conduits, flow controllers, monitoring means, etc. as desirable or required in a given end use application of the gas storage and dispensing apparatus.

The gas charging system 10 includes a gas source 42, which can be a bulk supply tank for the gas to be charged to the gas storage and dispensing vessel 102, or the gas source can be a gas manufacturing plant producing bulk quantities of the gas to be charged to the vessel 102, or the gas source can include other supply or generation facilities serving to provide the gas needed for charging of the vessel 102.

The gas charging system includes a cryotrap 12 defining a chamber therewithin for liquefaction of gas introduced to the chamber. The chamber is penetrated by a cold finger member 14, coupled via a recirculation circuit 18 with a refrigerator unit 16. The refrigeration circuit 18 includes a refrigerant feed line 20 for flowing refrigerant, e.g., liquid nitrogen, liquid helium, liquid oxygen, liquid fluorine or other refrigerant medium, from the refrigerator unit 16 to the cold finger member 14 of the cryotrap 12. The refrigerant medium is passed through internal passages in the cold finger member 14 so that the surface of the cold finger member exposed to the interior of the chamber in the cryotrap 12 is chilled to a temperature at which the gas to be charged is liquefied in the chamber upon contact with the cold finger member surface.

Although not illustrated, the refrigerant circuit lines 20 and 22 are in practice suitably provided with flow control valves therein, whereby the flow of the refrigerant medium through the refrigerant circuit 18 can be selectively initiated or terminated, as desired.

The refrigerant unit 16 can be of any suitable type, including conventional liquefaction equipment such as a cryogenic air separation plant for producing liquid oxygen and liquid nitrogen by cryogenic distillation and/or compression/expansion cycles. Alternatively, the refrigerator unit 16 can comprise a large-size superinsulated dewar containing the liquefied refrigerant medium, or the refrigerator unit 16 can include other mechanical, chemical or other refrigeration-producing apparatus and operations, which are arranged to be selectively interruptible so as to be able to cyclically cool and warm the cryotrap.

The cryotrap 12 is joined by cryotrap coupling line 26 to manifold line 28, which in turn is connected by branch lines 30 and 34 to the source/fill line 40. The portion of the source/fill line 40 between the junctions with branch lines 30 and 34 is equipped with flow control valve 44, and each of the branch lines 30 and 34 is likewise equipped with a valve, with branch line 30 containing flow control valve 32 and branch line 34 containing flow control valve 36. Branch line 34 also has a pressure transducer 38 coupled thereto, for monitoring of pressure in the flow circuitry coupling the cryotrap with the source/fill line 40. The source/fill line 40 thus is joined at one end thereof to the gas source 42 and at its opposite end to the fill port 50 of the gas storage and dispensing apparatus 100.

By this arrangement, the manifold line 28, branch lines 30 and 34 and associated valves 32 and 36 form a valved manifold assembly interconnecting the source/fill line 40 with the cryotrap 12.

The FIG. 1 charging system further comprises an automatic control assembly in the illustrated embodiment, comprising a central processing unit (CPU) 52 that is coupled in controlling relationship to various components of the charging system, including in the illustrative embodiment, the flow control valves 32, 36 and 44 (by control signal transmission lines 54, 58 and 56, respectively), and the gas source 42 (by control signal transmission line 60), the refrigerator unit 16 (by control signal transmission line 62). Additionally, the CPU 52 can be coupled in signal receiving relationship with any of suitable sensing and monitoring elements of the systems, e.g., the pressure transducer 38 (by input signal transmission line 64 in the illustrated embodiment), so that the CPU is responsive to process conditions in the charging system, and responsively actuates the valves 32, 36, 44, gas source 42 and refrigerator unit 16 as necessary.

In operation of the system shown in FIG. 1, with the gas fill port 50 of the gas storage and dispensing apparatus 100 being open for charging of the vessel 102 with gas, and with the set point of the regulator 132 being set at a value precluding discharge of gas from the vessel through outlet 124, gas from gas source 42 is flowed through the portion of source/fill line 40 upstream of the junction of such line with branch line 30, and into the branch line 30, e.g., with the gas source 42 being actuated by CPU via signal in signal transmission line 60 for such phase of operation. During such phase of operation, valve 32 in branch line 30 is open, and valve 44 in the source/fill line 40 and valve 36 in the branch line 34 are closed. The refrigerator unit 16 is actuated, e.g., by control signal from CPU 52 in signal transmission line 62, so that refrigerant medium is flowed in the flow circuit 18 through line 20 and the interior passages of the cold finger member 14, and returned to the refrigerator unit 16 in return line 22.

Source gas thereby flows into the interior chamber of the cryotrap 12 and is liquefied. After a predetermined volume of gas is thus liquefied, the flow of refrigerant medium in the flow circuit 18 is terminated, e.g., by appropriate control signal from CPU 52 to the refrigerator unit 16 in signal transmission line 62, to warm the cryotrap 12 and gasify the liquid therein, with valves 32 and 44 being closed and valve 36 being open, by corresponding control signals in the signal transmission lines from the CPU to the respective valves. The gas resulting from the gasification of the liquid in the cryotrap 12 then flows out of the chamber of the cryotrap 12, through lines 26, 28, 34 and 40 to the fill port 50 of the gas storage and dispensing apparatus 100. For such purpose, a mass flow controller can be disposed in the portion of source/fill line 40 downstream of the junction of branch line 34 with the source/fill line 40, to meter the flow of gasified medium into the gas storage and dispensing vessel 102.

Additionally, or alternatively, a one-way flow valve, admitting gas into the vessel, but restraining it from backflow toward the cryotrap, can be installed in the portion of source/fill line 40 downstream of the junction of branch line 34 with the source/fill line 40.

In this manner, an initial charge of gas is flowed into the vessel 102, in consequence of the high volumetric expansion of the gas during the gasification of the previously condensed liquid in the warming cryotrap 12.

When the initial charge of gas has been introduced into the interior volume 128 of the vessel 102, the valve 36 is closed, and valve 32 is opened, e.g., by control signals from the CPU, and source gas from gas source 42 is again flowed into the cryotrap 12 for liquefaction thereof against the cold finger member 14 surface in the interior chamber of the cryotrap, with circulation of refrigerant medium through the flow circuit 18 and interior passages of the cold finger member, the gas source and the refrigerator unit being actuated by appropriate control signals from the CPU for such phase of operation. When an appropriate amount of liquid has been condensed from the introduced source gas, the valve 32 is closed, e.g., by control signal in signal transmission line 54, the cryotrap warmed (by cessation of flow of the refrigerant medium through the cold finger member, effected via control signal in signal transmission line 62) to gasify the liquid, and valve 36 is opened, e.g., by control signal from CPU 52 in signal transmission line 58, to introduce a second charge of gas into the vessel 102.

The foregoing cycle is continued with successive liquefaction/gasification phases of operation until the vessel 102 is fully charged with gas at the desired pressure level.

As an illustrative embodiment, the source gas can be boron trifluoride ($BF_3$), having a boiling point of $-100°$ C., and the refrigerant medium can be liquid nitrogen, having a boiling point of −196° C., or liquid fluorine (F$_2$), having a boiling point of −188° C.

The pressure transducer 38 in branch line 34, consistent with the foregoing description, can be coupled in controlling relationship with valve controllers and/or cycle time programmable control units to carry out the fill operation in an automated manner. For such purpose, the valves 32, 36 and 44 can be arranged with valve actuators of a pneumatic, electrical or other type, linked in controlled relationship with the charging controller, which can include a suitable central processing unit (such as CPU 52 in the FIG. 1 embodiment) comprising a general purpose programmable computer, microprocessor or other processor apparatus that is arranged to switch the valves, e.g., in response to pressure in the flow circuitry associated with the cryotrap as sensed by the pressure transducer 38, so that successive liquefaction/gasification cycles are conducted in an optimal manner, with respect to charging time, refrigeration energy expenditure, etc.

Once the charging operation is complete, and the charged vessel is at a full fill state, with the contained gas in the vessel at the desired predetermined pressure level (e.g., a superatmospheric pressure which can for example be a pressure in a range of from about 2 to 20 atmospheres), the charging operation is terminated, and the vessel can be sealed in a conventional manner, such as by capping of the fill port 50 in the illustrative embodiment shown in FIG. 1.

Valve 44 in the source/fill line 40 is a normally closed valve that can be opened for purging of the charging system lines, as necessary, e.g., with the source/fill line 40 not coupled to a gas storage and dispensing apparatus 100, or with the purge gas flow diverted in some other manner, such as by a separate valved purge discharge line connected to the source/fill line 40.

The cryotrap 12 can be fabricated in any suitable manner using any suitable materials of construction, e.g., 304 stainless steel, which has appropriate physical and mechanical properties for use at liquid nitrogen temperatures, when liquid nitrogen is employed as the refrigerant medium. The choice of specific alloys or other materials of construction for the cryotrap can readily be made on the basis of the specific gas to be charged, the refrigerant medium and the duty cycles of chilling and warming of the cryotrap, having reference to any expansion/contraction, corrosion and other operating characteristics of the charging system.

It will therefore be appreciated that the charging system of the present invention minimizes the mechanical complexity of the charging operation, since there are only the normally static (open or closed) valves as moving parts of the system. The invention thereby achieves a material simplification of the charging process and apparatus required therefor, relative to the multiple vessel cascaded systems proposed by the prior art.

It will correspondingly be appreciated that the apparatus and method of the invention may be practiced in a widely variant manner, consistent with the broad disclosure herein. Accordingly, while the invention has been described herein with reference to specific features, aspects, and embodiments, it will be recognized that the invention is not thus limited, but is susceptible of implementation in other variations, modifications and embodiments. Accordingly, the invention is intended to be broadly construed to encompass all such other variations, modifications and embodiments, as being within the scope of the invention hereinafter claimed.

What is claimed is:

1. A gas charging system for charging of a gas storage and delivery apparatus including a gas storage and delivery vessel having an interior volume for holding gas for subsequent dispensing said gas charging system comprising:
   (a) a gas source of tire gas to be charged to the vessel;
   (b) a cryotrap;
   (c) a refrigerator unit coupled to the cryotrap and selectively actuatable to supply refrigeration to the cryotrap, and de-actuatable to terminate the supply of refrigeration to the cryotrap;
   (d) flow circuitry interconnecting the gas source and cryotrap, arranged for selective initiation of flow of gas from the gas source to the cryotrap, and selective termination of flow of gas from the gas source to the cryotrap, said flow circuitry further coupleable to a vessel to be charged with gas, to interconnect the cryotrap and said vessel, and said flow circuitry being operably arranged for flowing gas to the cryotrap and refrigerating the cryotrap by the refrigerator unit to liquefy gas in the cryotrap, while the flow circuitry is closed to flow between the cryotrap and the vessel, in a first phase of operation, and terminating refrigeration of the cryotrap by the refrigerator unit to warm the cryotrap arid gasify liquid therein, with the flow circuitry closed to flow of gas from the gas source to the cryotrap, and open to flow of gasified gas from the cryotrap to the vessel, in a second phase of operation, with the flow circuitry being operably arranged for repetitive first and second phases of operation until said vessel is charged with gas to a predetermined full fill state at a predetermined pressure, followed by termination of gas flow to the vessel and removal of said vessel from the flow circuitry for sealing of the vessel, whereby said vessel after said removal and sealing stores gas in said predetermined full fill state and at said predetermined pressure, for subsequent dispensing.

2. The gas charging system of claim 1, wherein the flow circuitry includes selectively actuatable flow control valves.

3. The gas charging system of claim 1, wherein the cryotrap includes an interior chamber, and a cold finger member protruding into the interior chamber and present a chilling surface for contacting of gas from the gas source, for liquefaction thereof.

4. The gas charging system of claim 3, wherein the refrigerator unit is coupled to the cold finger member for flow of refrigerant medium therethrough.

5. The gas charging system of claim 4, wherein the refrigerator unit is adapted to supply said refrigerant medium as a liquid to the cold finger member, wherein said liquid comprises a liquid species selected from the group consisting of liquid nitrogen, liquid oxygen, and liquid fluorine.

6. The gas charging system of claim 1, comprising a controller arranged to control flow of gas through said flow circuitry.

7. The gas charging system of claim 6, wherein the flow circuitry comprises valves for selective initiation or termination of flow of gas through said flow circuitry.

8. The gas charging system of claim 7, wherein said valves comprise automatic valve actuators.

9. The gas charging system of claim 8, wherein said automatic valve actuators comprise pneumatic valve actuators.

10. The gas charging system of claim 8, wherein said automatic valve actuators comprise electrical valve actuators.

11. The gas charging system of claim 1, wherein the flow circuitry is coupled to a said gas storage and dispensing apparatus including a gas storage and dispensing vessel.

12. The gas charging system of claim 11, wherein the gas storage and dispensing apparatus includes a gas dispensing assembly coupled to the gas storage and dispensing vessel, and said gas dispensing assembly includes a regulator.

13. The gas charging system of claim 12, wherein the regulator is interiorly disposed in the gas storage and dispensing vessel.

14. The gas charging system of claim 1, further comprising a sensor arranged for sensing a condition of gas in said charging system.

15. The gas charging system of claim 14, wherein the sensor is arranged for sensing the condition of gas in said flow circuitry.

16. The gas charging system of claim 15, wherein the sensor comprises a pressure transducer sensor for monitoring pressure of gas in the flow circuitry.

17. The gas charging system of claim 16, further comprising a central processing unit (CPU) arranged for controlling operation of said flow circuitry, wherein the pressure transducer sensor is coupled in input signal transmission relationship with the CPU.

18. The gas charging system of claim 17, wherein the CPU is arranged to carry out a predetermined number of liquefaction and gasification steps to fill the gas storage and dispensing vessel to a predetermined pressure level.

19. The gas charging system of claim 1, wherein the gas source comprises a source of a semiconductor manufacturing gas.

20. The gas charging system of claim 1, wherein the gas source comprises a source of a gas selected from the group consisting of arsine, phosphine, stibine, silanes, disilanes, halosilanes, diborane, hydrogen fluoride, boron trichloride, boron trifluoride, hydrogen chloride, and organometallic reagent gases.

21. The gas charging system of claim 1, wherein the gas source comprises a boron trifluoride gas source and the refrigerator unit is arranged to supply liquid nitrogen as a refrigerant medium to said cryotrap.

22. A gas charging system for charging a gas storage and dispensing vessel with gas, said gas charging system comprising:

a gas source comprising gas to be charged to the vessel;

a source/fill line connecting the gas source in flow communication with said vessel;

a cryotrap arranged for selective cooling of gas to liquefy same, and warming of liquefied gas to gasify same;

a valved manifold assembly interconnecting the source/fill line and the cryotrap and arranged to selectively flow gas from the gas source through the valved manifold assembly to the cryotrap for liquefaction of source gas therein during a first phase of operation, and to selectively flow gasified gas from the cryotrap through the valved manifold assembly to the source/fill line for flow to the vessel during a second phase of operation; and a controller arranged to operate valves of the valved manifold assembly to conduct said first and second phases of operation in an alternating and repetitive manner, to progressively fill said vessel with gas to a filled state with said valved manifold assembly being operably arranged under control of said controller for repetitive first and second phanses of operation until said vessel is charaed with gas to a predetermined full fill state at a predetermined pressure, followed by termination of gas flow to the vessel and removal of said vessel from the flow circuitry for sealing of the vessel, whereby said vessel after said removal and sealing stores gas in said predetermined full fill state and at said predetermined pressure, for subsequent dispensing.

23. The gas charging system of claim 22, wherein the controller comprises a central processing unit including a general purpose programmable computer programmably arranged to effect said first and second phases of operation in accordance with a predetermined program.

24. The gas charging system of claim 23, wherein the central processing unit is coupled in signal transmission relationship with the gas source and cryotrap for modulating their operation in accordance with said predetermined program.

25. A method of charging a gas storage and dispensing vessel with a gas to a predetermined pressure level, comprising:

(a) providing source gas;

(b) liquefying said source gas to form a source liquid;

(c) gasifying the source liquid in closed flow communication with the vessel, to flow the gasified gas into the vessel;

(d) repeating steps (a)–(c) in sequence, for sufficient repetitions to fill the vessel with gasified gas to said predetermined pressure level;

(e) removing said vessel from closed flow communication with the gasifying source liquid; and (f) sealing said vessel, whereby said vessel contains gas at said predetermined pressure level, for subsequent storage and dispensing.

26. The method of claim 25, wherein said liquefying step (b) comprises liquefaction of the source gas in a cryotrap.

27. The method of claim 26, wherein the cryotrap is refrigerated by a refrigerant medium including a liquid species selected from the group consisting of liquid nitrogen, liquid oxygen and liquid fluorine.

28. The method of claim 26, comprising delivering the source gas to the cryotrap via a valved manifold assembly, which is controllably operated to close the cryotrap to flow to the vessel during said liquefying step (b), and to close the cryotrap to introduction of source gas during said gasifying step (c).

29. The method of claim 25, wherein the vessel comprises a closed vessel having a gas dispensing assembly coupled thereto for selective discharge of gas from the vessel subsequent to fill of the vessel to said predetermined pressure level.

30. The method of claim 29, wherein the vessel has a gas regulator interiorly disposed in said closed vessel, whereby gas is selectively dispensable from the vessel at a pressure determined by a set point of said gas regulator.

31. The method of claim 25, wherein the source gas comprises a gas species selected from the group consisting of arsine, phosphine, stibine, silanes, disilanes, halosilanes, diborane, hydrogen fluoride, boron trichloride, boron trifluoride, hydrogen chloride, and organometallic reagent gases.

32. The method of claim 26, wherein the cryotrap is refrigerated by a refrigerant medium including liquid nitrogen, and the source gas comprises boron trifluoride.

* * * * *